United States Patent [19]
Gallant et al.

[11] Patent Number: 5,590,175
[45] Date of Patent: Dec. 31, 1996

[54] METHOD AND SYSTEM FOR ENHANCED CALL COMPLETION IN TELECOMMUNICATIONS MOBILITY APPLICATIONS

[75] Inventors: John K. Gallant; Steven R. Donovan, both of Plano, Tex.

[73] Assignee: MCI Communications Corporation, Washington, D.C.

[21] Appl. No.: 443,185

[22] Filed: May 17, 1995

[51] Int. Cl.[6] .................................................. H04Q 7/22
[52] U.S. Cl. .............................. 379/58; 379/59; 379/60; 455/33.1
[58] Field of Search .............................. 379/58, 59, 60; 455/33.1, 33.2, 56.1

[56] References Cited

U.S. PATENT DOCUMENTS

| | | |
|---|---|---|
| 5,095,505 | 3/1992 | Finucane et al. . |
| 5,210,787 | 5/1993 | Hayes et al. ........................... 379/60 |
| 5,222,120 | 6/1993 | McLeod et al. . |

OTHER PUBLICATIONS

Pautet, M. B. et al., "GSM Protocol Architecture: Radio Subsystem Signalling", IEEE Vehicular Technology Conf. May 1991, pp. 326–332.
Balston, D. M., "Pan–European Cellular Radio", IEEE Electronics & Communications Engineering Journal, Jan.–Feb./89 pp. 7–13.
Goodman, D. J., "Second Generation Wireless Information Networks", IEEE Transactions on Vehicular Technology, vol. 40, No. 2, May 1991, pp. 366–374.
Strawman for Automatic Roaming, Electronic Industries Association, Jun. 1985.

*Primary Examiner*—Curtis Kuntz
*Assistant Examiner*—G. J. Oehling

[57] ABSTRACT

A call directed to a mobile telephone station from a public switch telephone network is received in a mobile services switching center of a mobile telephone network. An attempt is made to locate the profile of the mobile telephone station in a visitor location register. If the mobile telephone profile is not found in the visitor location register, a query message is sent to a home location register requesting routing information for the call. The profile has an HLR query flag for indicating whether the home location register should be queried. If the profile of the mobile telephone station is found in the visitor location register, the status of the HLR query flag is checked. If the HLR query flag is set to yes, a query message is sent to a home location register requesting routing information for the call. If the HLR query flag is set to no, the call to the mobile telephone station is completed using the profile in the visitor location register. In all other cases, a query message requesting routing information has been sent to the home location register, so the call to the mobile telephone station is completed using the routing information received from the home location register.

4 Claims, 11 Drawing Sheets

METHOD AND SYSTEM FOR ENHANCED CALL COMPLETION IN TELECOMMUNICATIONS MOBILITY APPLICATIONS

BACKGROUND OF THE INVENTION

1. Field of the Invention

The invention disclosed broadly relates to telecommunications systems and more particularly relates to mobility applications.

2. Background Information

In 1982, the global system for mobile communications (GSM) was established in Europe, to provide a cellular mobile radio system. The primary function of the GSM is to provide a full roaming mobile telephone service. The GSM protocol has been selected for use around the world for digital cellular telephone service. The principles of operation of the existing GSM digital cellular telephone system is described in the following references: Balston, D. M., "Pan-European Cellular Radio" IEEE, Electrical and Communications Journal, No. 1, pp. 7–13, 1989.

Goodman, D. J., "Second Generation Wireless Information Networks", IEEE Transactions on Vehicular Technology, VT-40, May 1991, pp. 366–374.

Pautet, M. B., and Monly, M., "GSM Protocol Architecture: Radio Subsystem Signalling", IEEE Vehicular Technology Conference, May 1991, pp. 326–332.

A cellular mobile radio system includes a variety of elements. There are mobile stations (cellular telephones). Each cell of the cellular network contains a base station which transmit calls to and receive calls from the mobile stations using radio. There are base station controllers (BSC) which control a cluster of base stations. There are mobile switching centers (MSC) which route calls between base stations, other mobile switching centers and the public switch telephone network. Each MSC is associated with a home location register (HLR) and a visitor location register (VLR). The HLR stores a mobile station profile for each mobile station in the network. When a mobile station is operated, the mobile station profile in the HLR corresponding to that mobile station is sent over a data network to a VLR associated with the MSC serving the cell in which the mobile station is located. Several data network messages are required to complete each transaction. A transaction occurs every time a call is placed or received by a mobile station, as well as every time a mobile station is switched on. A problem in the prior art is that the call traffic capacity of the system is limited by the message handling capacity of the data network coupling the VLRs with the home location register. The message handling capacity of the data network can be increased by increasing the number of HLRs or by increasing the throughput of the data network, but this requires investment in new or additional equipment.

SUMMARY OF THE INVENTION

An object of the invention is a method to reduce the network message traffic between a home location register (HLR) and other portions of a gobal systems mobile (GSM) network.

These and other objects, features and advantages are accomplished by the invention disclosed herein. The invention provides for selectively eliminating the need to access the HLR for those calls made to a mobile station which has its home location at the same base station as that receiving the call from the public switch telephone network. In accordance with the invention, the visitor locations register (VLR) includes a mobile station profile for each local mobile station in the vicinity of the base station. Included with the mobile station profile is an HLR query flag which determines whether an access is required from this base station to the HLR, for example for call forwarding or roaming information. If the HLR query flag indicates that there is no need to access the HLR, then sufficient information is available in the mobile station profile to provide adequate routing information to the local mobile switching center (MSC) at the local base station, to complete the call to the mobile station.

If the mobile station is elsewhere in the GSM network and is not located proximate to the base station receiving the call from the public switch telephone network, or alternately if it is desired to have a call forwarding feature, then the subscriber profile stored in the VLR at the base station, will have its HLR query flag set on. When the HLR query flag is set on, the incoming call from the public switch telephone network will initiate a response via the MSC and the VLR, to cause the base station to access the HLR in order to obtain the necessary routing information to complete the call. The HLR query flag in the VLR serves as a pointer or trigger to initiate the accessing by the base station of the HLR.

In this manner, the large number of calls from a public switch telephone network directed to a mobile station within the geographic vicinity of the base station receiving the incoming call, can be handled without exchanging control information with the centralized HLR.

DESCRIPTION OF THE FIGURES

Objects, features and advantages will be more fully appreciated with reference to the accompanying figures.

DETAILED DESCRIPTION OF THE INVENTION

Figure 1:
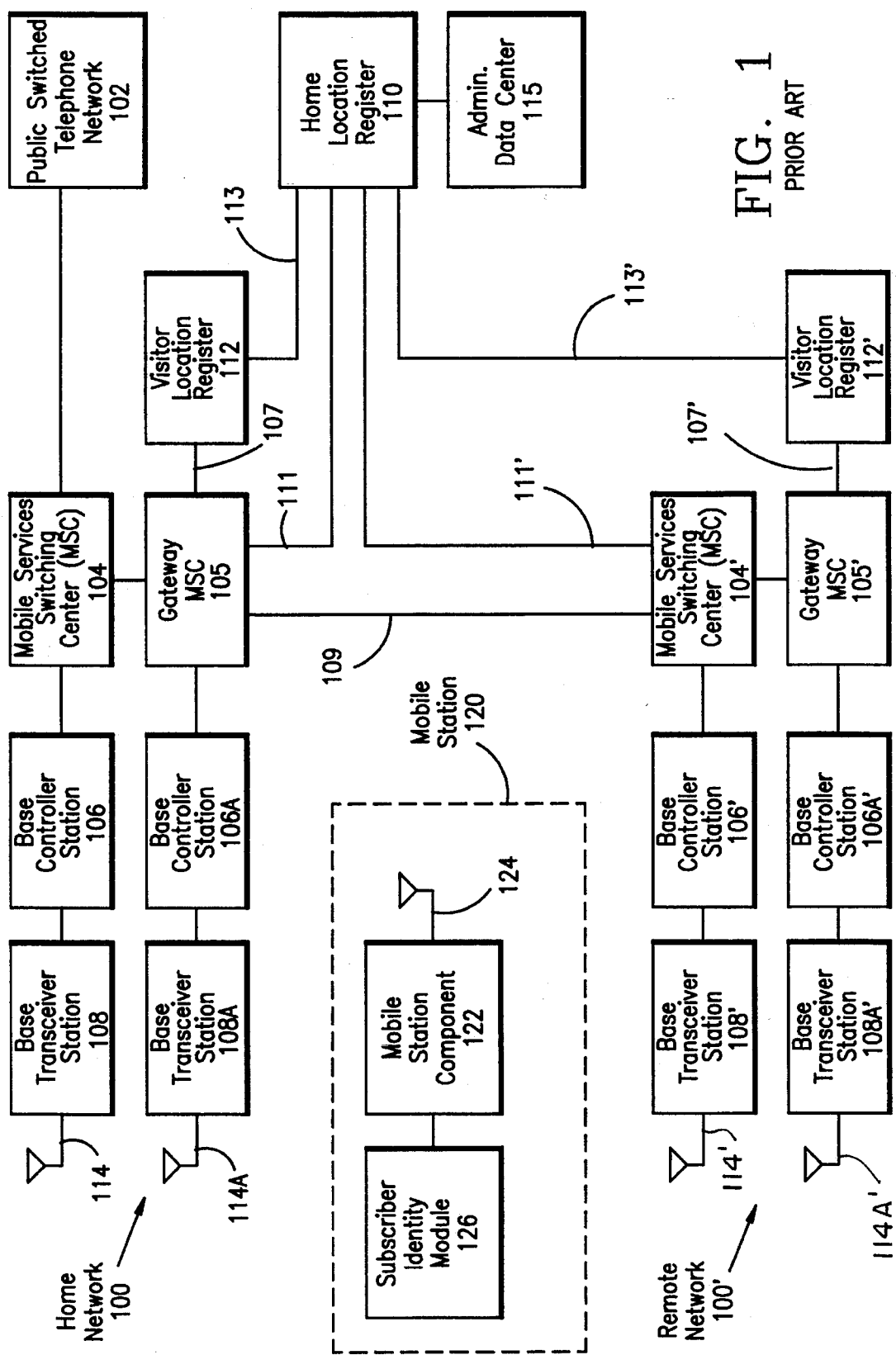
FIG. 1 is a architectural diagram of a GSM network, in accordance with the invention.

In FIG. 1, many of the elements shown represents a plurality of similar elements, although only a limited number are shown and described. The public switch telephone network 102 is connected to the mobile services switching center (MSC) 104. The base station controller (BSC) 106 is connected to the MSC 104, and the base transceiver station (BTS) 108 is connected to the BSC 106. Each BTS 108 depicted in FIG. 1 represents a plurality of BTSs 108 which are part of a base station cluster controlled by the BSC 106. The BTS 108 transmits and receives radio signals on the antenna 114. For much of the network, BTSs are organized in a seven cell or twelve cell repeat pattern with omnidirectional coverage for each. Thus, seven or twelve BTSs are connected to each BSC 106. Most BTSs have between 20 and 30 voice channels with one signaling channel carrying all of the paging and access functions per cell. Each BSC 106 represents a plurality of BSCs connected to MSC 104. BSC 106 controls the operation of each connected BSC 108.

Each MSC 104 represents a plurality of MSCs. MSC 104 is a digital exchange with a distributed control architecture especially adapted for operation in the cellular environment. The base transceiver stations 108 and base station controllers 106 are connected to the MSCs 104 over digital lines. MSCs in a local area are connected to form a local network 100. Each local network 100 has a gateway MSC 105 which provides communication with other local networks 100' over communication line 109 and with the home location register (HLR) 110, over communication line 111.

The system also includes mobile stations 120 which represents a plurality of mobile stations present in the network. Mobile station 120 includes the mobile station component 122 and its antenna 124, which receives and transmits radio signals with the antenna 114 of the base station 100. Mobile station 120 also includes the subscriber identity module (SIM) 126 which personalizes a mobile station 120.

Associated with each MSC 104 is a visitor location register (VLR) 112. Each MSC 104 typically has its own VLR 112, but this is not required. Gateway MSC 105 provides gateway services between a VLR 112 and MSC 104, when VLR 112 is located separately from MSC 104, as shown in FIG. 1. VLR 112 stores selected data relating to mobile stations 120 that are visiting within the home network 100 associated with VLR 112 and its MSC 104. The data stored in VLR 112 is transferred from HLR 110 to VLR 112 for each mobile station 120 within the home network 100 of the VLR 112. This data can include the international mobile station identity (IMSI), the mobile station international ISDN number, and other information, including the current geographic location of the mobile station 120, and the services available to the mobile station 120, for example supplementary voice services or data services.

Each MSC 104 is associated with a home location register (HLR) 110 in the network. In principle there need be only one home location register 110 for the entire GSM network. In practice, there are generally several so as to accommodate the large quantity of data which is required to be stored in the HLR 110. The home location register (HLR) 110 stores all management data relating to all of the mobile stations 120 in the network. This data includes the international mobile station identity (IMSI), the mobile station profile of capacities and services unique to the mobile station 120, and the location of the mobile station 120 within the overall GSM network. HLR 110 is connected over signaling network 113 to the MSCs 104 of all networks 100 in the system. HLR 110 is connected to the MSCs 104 within each network 100 by way of gateway MSC 105. Control messages are exchanged between the MSC 104, VLR 112 and HLR 110, using the mobile application part (MAP) communication protocol.

Every mobile station 120 is allocated to a specific HLR 110 and the code which forms a part of the international mobile station identity (IMSI) for a particular mobile station 120, will include the information identifying the specific HLR 110. This information is used to enable calls to be made when, for example, a mobile station 120 visits a network other than its home network. The mobile station 120 is requested to pass the IMSI on the uplink to the nearest base station 100 and this value is forwarded via the MSC 104 to the VLR 112 connected to the MSC 104. In the prior art GSM systems, the VLR112 then accesses the HLR 110 via fixed network links, in order to obtain the selected information needed for registration of the mobile station 120.

A mobile station roaming number (MSRN) and a temporary mobile subscriber identity (TMSI) are also allocated by the visited network. An authentication process is carried out and if this is successful, access is permitted and the mobile station originated calls can then be made, while the registration of the mobile station's location enables incoming calls from the public switch telephone network 102, to be routed to the correct base station 100 and sent over the radio link to the mobile station 120.

A call may be placed from the public switch telephone network 102 through the mobile services switching center 104, directed to the mobile station 120. If the geographic location of the mobile station 120 is closer to one of the base transceiver stations 108' or 108A' connected in the remote network 100', which is controlled by the mobile services switching center (MSC) 104', then the call is directed from the home network 100 and its mobile services switching center 104, to the remote network 100' and the mobile services switching center 104'. Then, in the remote network 100' the MSC 104' directs the call to either the base transceiver station 108' or 108A' depending upon which one is closer to the mobile station 120.

If a call is placed to a mobile station 120 which is within the service area of one of the base transceiver stations 108 or 108a directly connected to the mobile services switching center 104, then the call is switched from the mobile services switching (MSC) 104 directly to the base transceiver station 108 or 108A which is in closest proximity to the mobile station 120. In the prior art the VLR 112 always accesses the HLR 110 over the fixed network link 113, in order to obtain the selected information needed for registration of the mobile station 120 and the home network 100. The reference by the VLR 112 to the home location register 110 occurs every time a call is placed between the public switch telephone network 112 and the mobile station 120, in the prior art. It can been seen that the signaling activity between the HLR and the VLR is significantly high and can form a bottleneck limiting the number of cellular calls that can be placed in the prior art GSM network.

Figure 2:
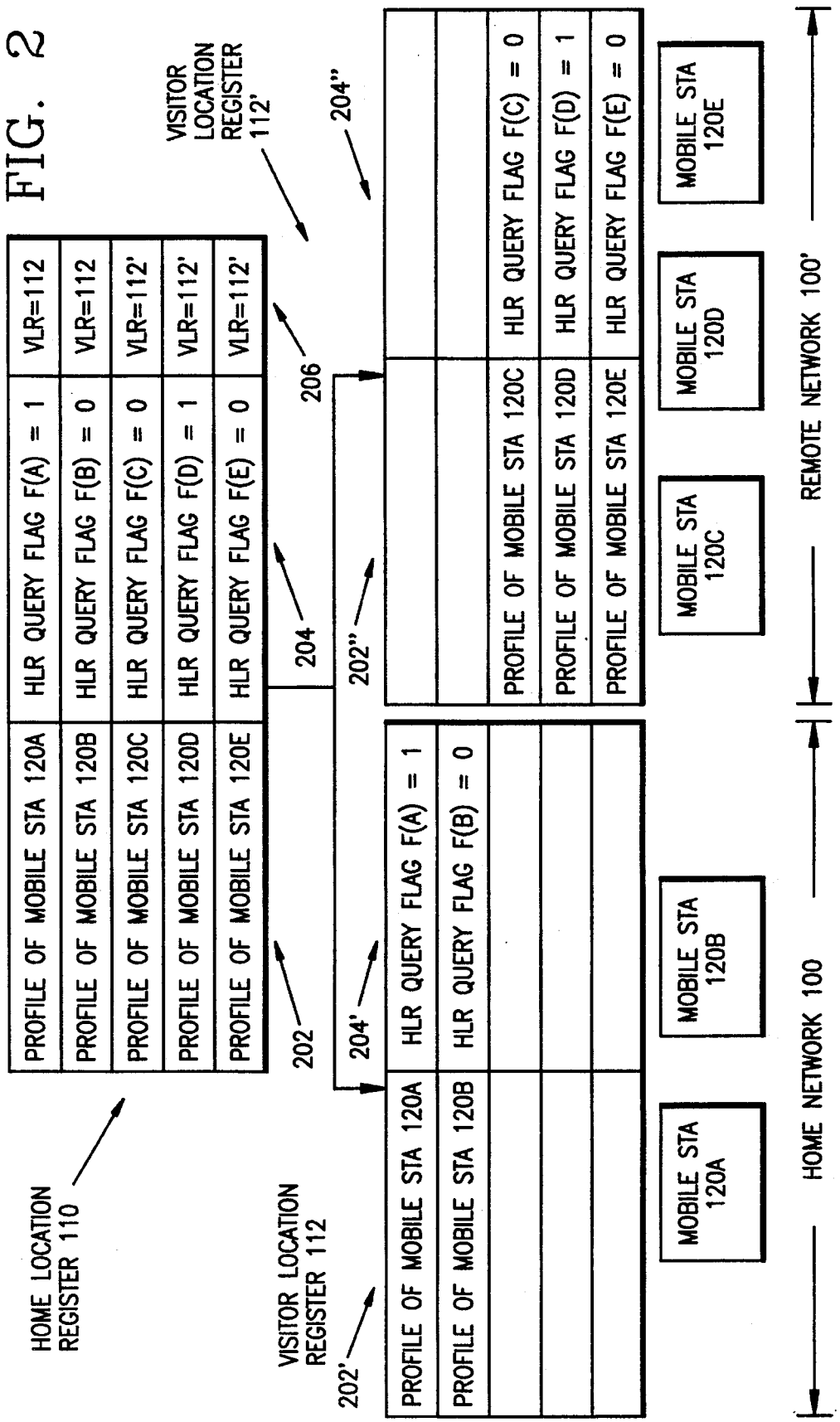
FIG. 2 is an organizational diagram showing the home location register and visitor location registers, in accordance with the invention.

In FIG. 2 it can be seen how the present invention accomplishes the reduced data flow. FIG. 2 shows HLR 110, VLR 112 and VLR 112' in more detail. HLR 110 includes a plurality of profiles 202 for a plurality of mobile stations 120. For example, a profile 202 of mobile station 120A is the profile corresponding to mobile station 120A of FIG. 2. An HLR query flag 204 F(A) is included along with a profile for the for each mobile station 120. The HLR query flag 204 is a binary value which when set to zero indicates that there is no necessity for VLR 112 to make a reference over line 113 to HLR 110. When the HLR query flag 204 F(A) is set equal to a binary value of one, the flag indicates that it is necessary for VLR 112 to make a reference over line 113 to the HLR 110.

The HLR query flag is set whenever a service is activated in the HLR which requires an HLR interaction for Mobile terminating calls. An example of such service is "Barring of all Incoming Calls" or "Call Forwarding". Whenever the subscriber activates this service, during the HLR updating of the VLR, the flag is set so the calls are forced to query the HLR. Whenever these types of services are inactivated, the HLR query flag is cleared. When the HLR query flag is cleared, the VLR contains sufficient information that an access of the HLR is not necessary in order to route the call.

Also included in HLR 110 along with a profile for a mobile station such as mobile station 120A, is information about the location of the mobile station 120A within the overall GSM network. That information is in the form of an identifier 206 of the VLR 112 for the home network 100 within which the mobile station 120 is currently located. As seen in FIG. 2, mobile station 120A and mobile station 120B are within the home network 100 area whereas the mobile station 120C, 120D and 120E are within the remote network 100' area. Mobile station 120A and 120B are indicated as being located at the VLR 112. Mobile station 120C, 120D and 120E are indicated as being located at the VLR 112'. This information is used to direct the downloading of selected profile information from the home location register 110 to the VLR 112 or 112' whose network 100 or 100' is the current location for the corresponding mobile station 120.

As is shown in FIG. 2, selected profile information is downloaded from the HLR 110 to the VLR 112, in accordance with the geographic information for each respective mobile station 120, stored in the HLR 110. The profile for the mobile station 120A and 120B being designated as profile information 202', is stored in the VLR 112 Also stored in the VLR 112 is the HLR query flag value for the corresponding mobile stations. Similarly, the profile information for mobile stations 120C, 120D and 120E which is referred to as profile information 202' in FIG. 2, is stored in the VLR 112'. Also stored in the VLR 112' is the query flag information 204' for those three mobile stations 120C, 120D and 120E.

Figure 3:
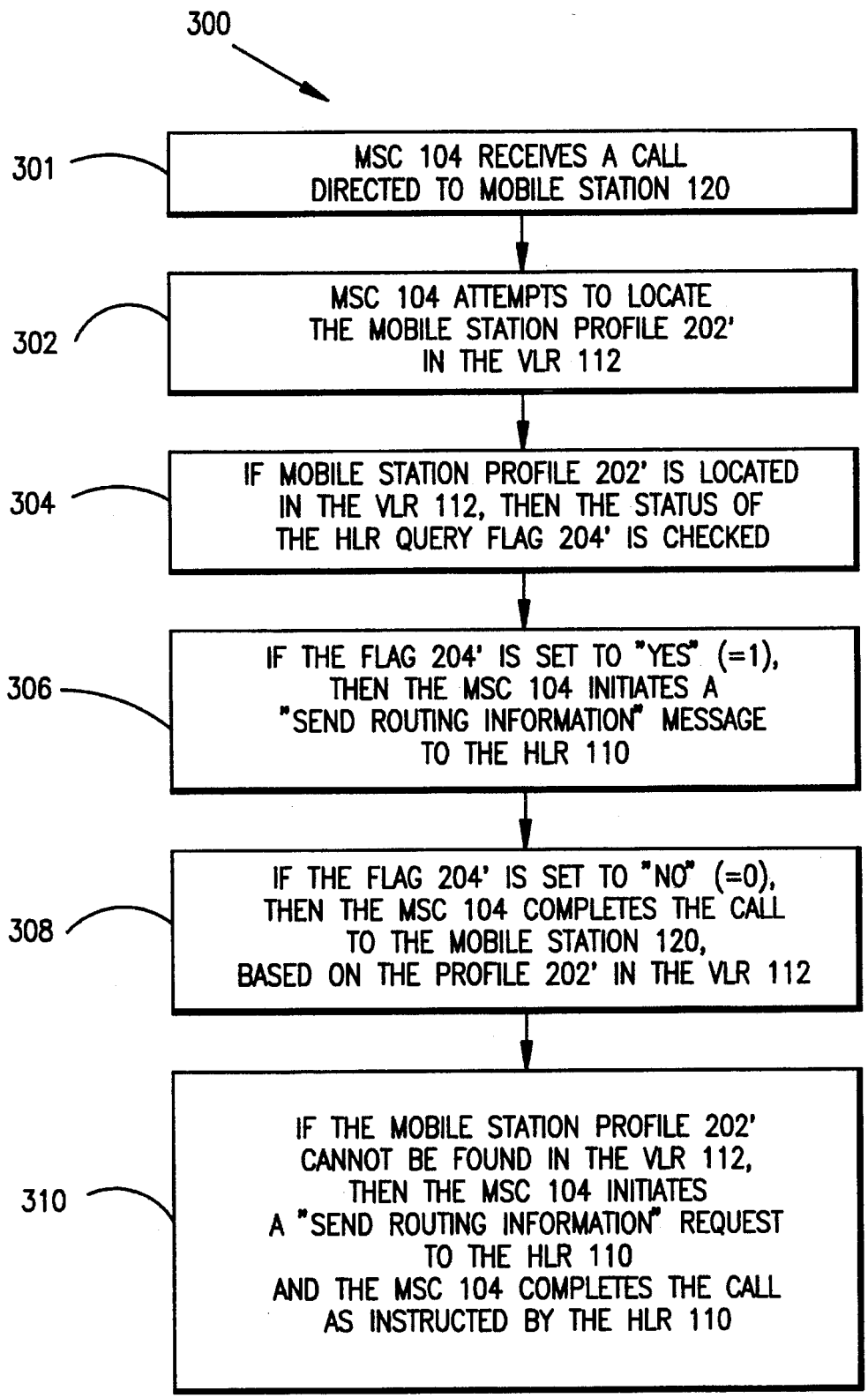
FIG. 3 is a flow diagram of a sequence of operational steps for the MSC call processing program 300, in accordance with the invention.

Turning now to the flow diagram of FIG. 3, which is best understood with reference to FIG. 2, step 301 has the MSC 104 receiving a call from the public switch telephone network 102 which is directed to one of the mobile stations 120. Then at step 302, the MSC 104 attempts to locate the mobile station profile 202' in its corresponding VLR 112. Then in step 304, if the mobile station profile 202' is located in the VLR 112, then the status of the HLR query flag 204' is checked. Then at step 306, if the HLR query flag 204' is set to "yes" which is a binary value of 1, then the MSC 104 initiates "send routing information" message to the centralized HLR 110 over line 113.

Alternately, and in accordance with the invention, in the step 308, if the flag 204' is set to "no" which corresponds to a binary value of zero, then the MSC 104 completes the call to the mobile station 120, based upon the profile information 202' stored in its local VLR 112. In step 310, alternately, if the mobile station profile 202' cannot be found in the VLR 112, then the MSC 104 initiates a "send routing information" request to the HLR 110, over the line 113, and the MSC 104 then completes the call as instructed by the HLR 110 after it downloads its profile information to the VLR 112, or makes a direct signaling information transfer over the line 111 to the MSC 104.

In this manner, the signaling traffic between the VLR 112 and the home location register 110, is significantly reduced thereby increasing the overall effective capacity of the GSM network.

Figure 4:
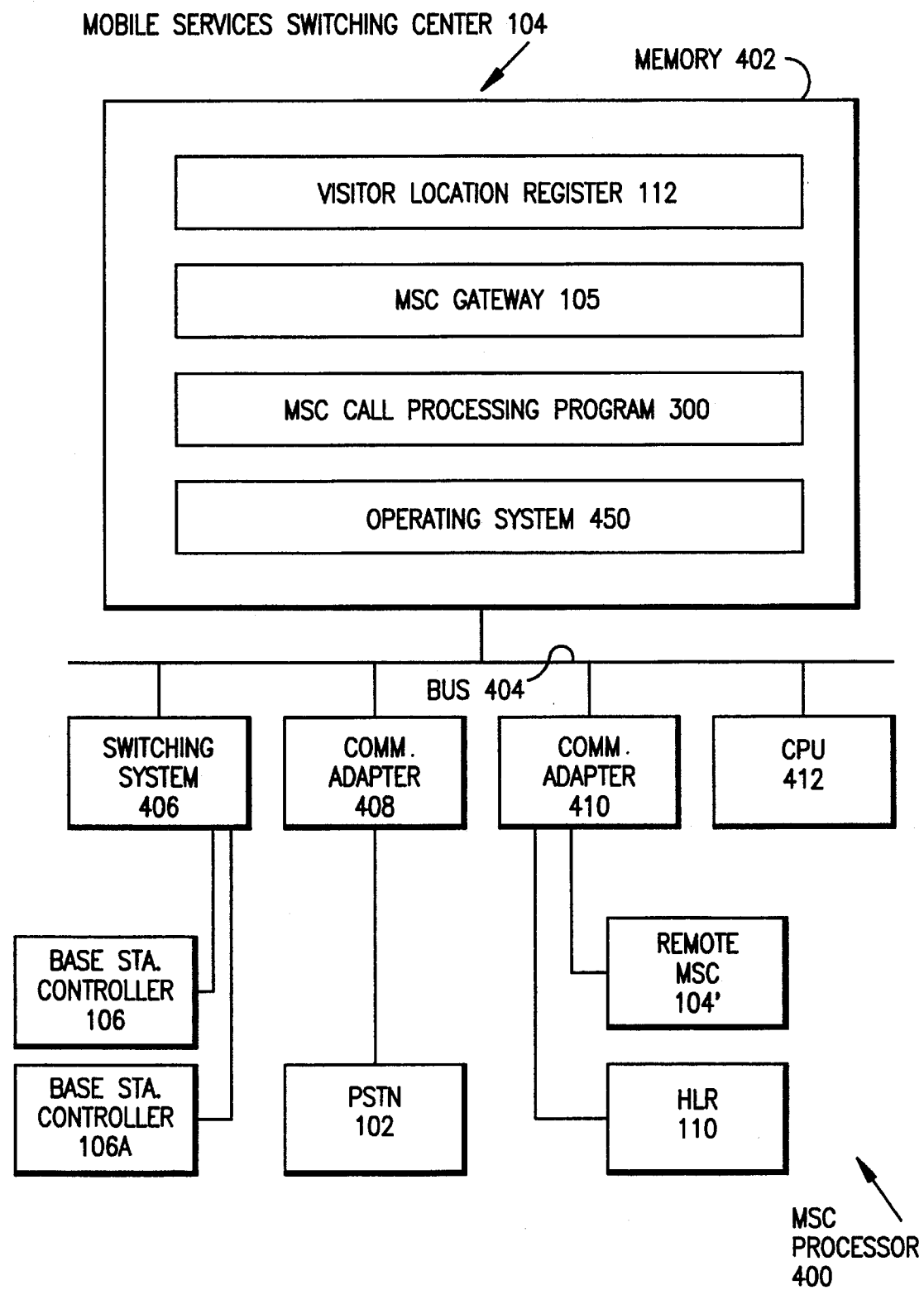
FIG. 4 is a functional block diagram of the mobile switching center 104, and its MSC processor 400, in accordance with the invention.

Turning now to FIG. 4, the mobile services switching center (MSC) 104 is illustrated in a block diagram, focusing on the MSC processor 400. The MSC processor 400 includes a memory 402, connected by means of the bus 404 to the switching system 406, the communications adapter 408, the second communications adapter 410, and the central processing unit (CPU) 412. The switching system 406 selectively controls switching between the public switch telephone network 102 through the communications adapter 408, the base station controller 106, and the base station controller 106A. The second communication adapter 410 controls the interconnection of the MSC 104 with the remote MSC 104' over line 109 and the HLR 110 over line 111.

The memory 402 of the MSC processor 400 includes the visitor location register 112 which is a partitioned area of the memory within which the profile information for visiting mobile stations 120, can be stored. Also included in memory 402 is the MSC gateway 105 which provides the gateway services between the MSC 104 and the base station controllers, the public switch telephone network, the remote MSC, and the HLR. Also included in the memory 402 is the MSC call processing program 300 whose flow diagram is shown in FIG. 3. Also included in the memory 402 is the operating system 450. All programs stored in the memory 402 are sequences of executable instructions which were executed in the CPU 412, carry out the methods of the invention.

Figure 5:
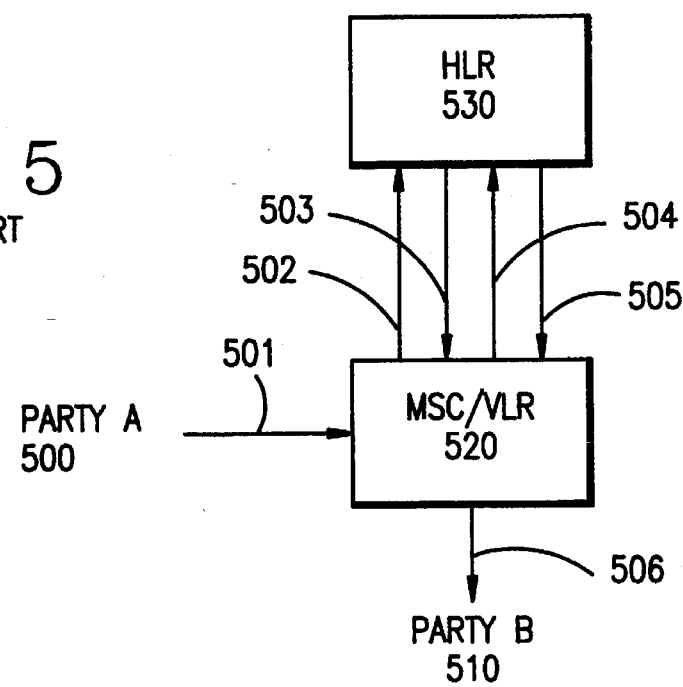
FIG. 5 illustrates a data flow diagram of the GSM network in the prior art.

Turning now to FIG. 5, the prior art data flow between MSC/VLR and HLR is seen in detail. In FIG. 5, the mobile station is within the local MSC network. In response to an incoming call request 501 from Party A 500, the MSC/VLR 520 sends a request 502 for routing information to the HLR 530. The HLR 530 sends the routing information 503. The MSC/VLR 520 sends an acknowledgment 504 for the received routing information and the HLR 530 sends an acknowledgment 505 for the acknowledgment 504. The MSC/VLR 520 then completes the call 506 to Party B. It is seen that in every case where a call is placed between the public switch telephone network and a mobile station, several references have to be made from the MSC/VLR 520 to the HLR 530.

Figure 6:
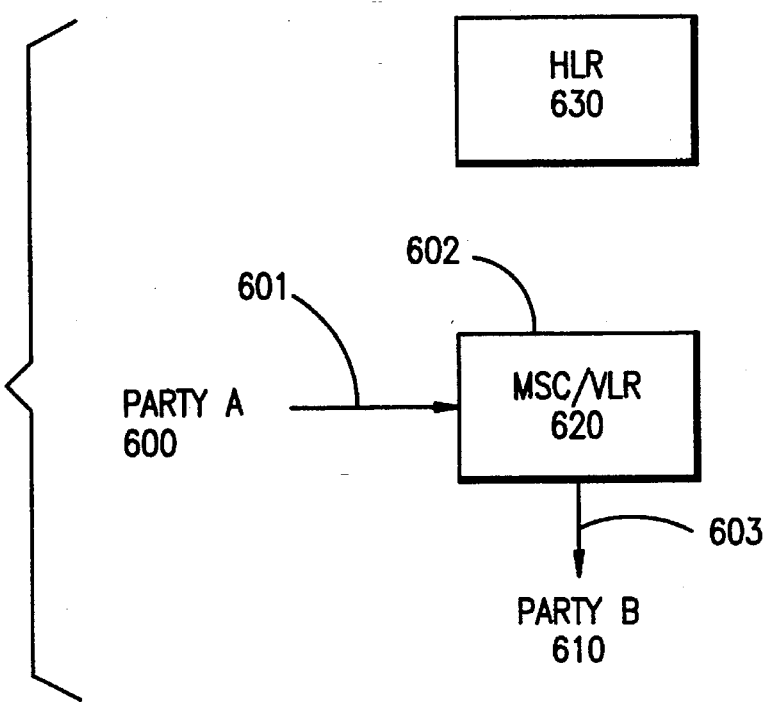
FIG. 6 is a data flow diagram illustrating the GSM network, in accordance with the invention.

Turning now to FIG. 6, the data flow between MSC/VLR and HLR in accordance with the present invention is seen in detail. The mobile station is within the local MSC network. No access needs to be made between the MSC/VLR 620 and the HLR 630. This significantly reduces the traffic bottlenecks occurring between the MSC/VLR 620 and the HLR 630. In response to incoming call request 601 from Party A 600, MSC/VLR 620 looks 602 in its local VLR, finds the needed subscriber information for Party B in the VLR and does not send any messages to the HLR 110. The MSC/VLR 620 then completes 603 the call to Party B 610.

Figure 7:
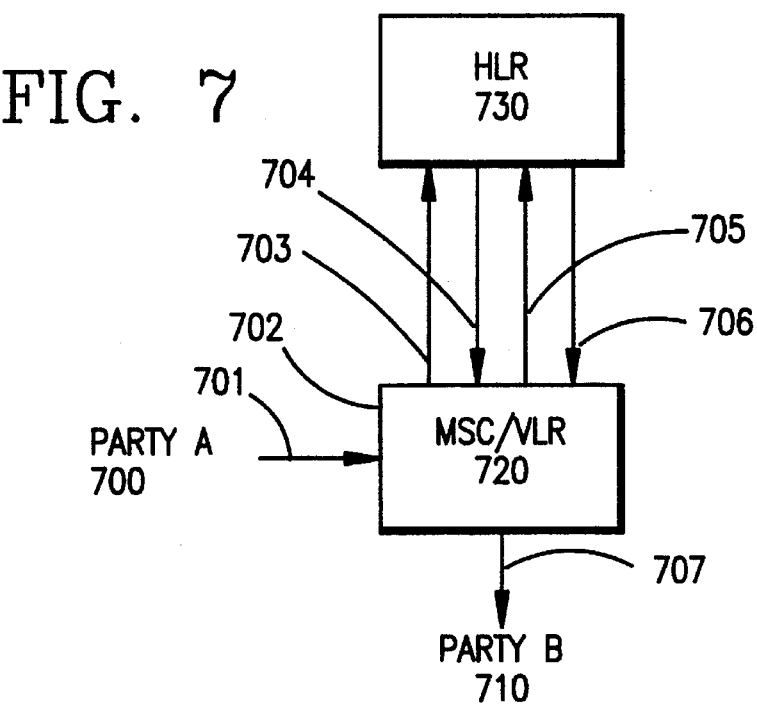
FIG. 7 is a data flow diagram of the GSM network, in accordance with the invention.

In FIG. 7, the mobile station is not in the vicinity of the MSC which is handling a call between the public switch telephone network and the mobile station. Access must be made between the MSC/VLR 720 and the HLR 730 to get the appropriate profile information to redirect the call to the MSC within whose domain the mobile station is currently located. In response to an incoming call 701 from Party A, the MSC/VLR 720 looks 702 in the VLR for routing information for Party B 710 and finds that the HLR query bit is set. The MSC/VLR 720 then sends a request 703 for routing information to the HLR 730. The HLR 730 sends the routing information 704. The MSC/VLR 720 sends an acknowledgment 705 for the received routing information and the HLR 730 sends an acknowledgment 706 for the acknowledgment 705. The MSC/VLR 720 then completes the call 707 to Party B 710.

Figure 8:
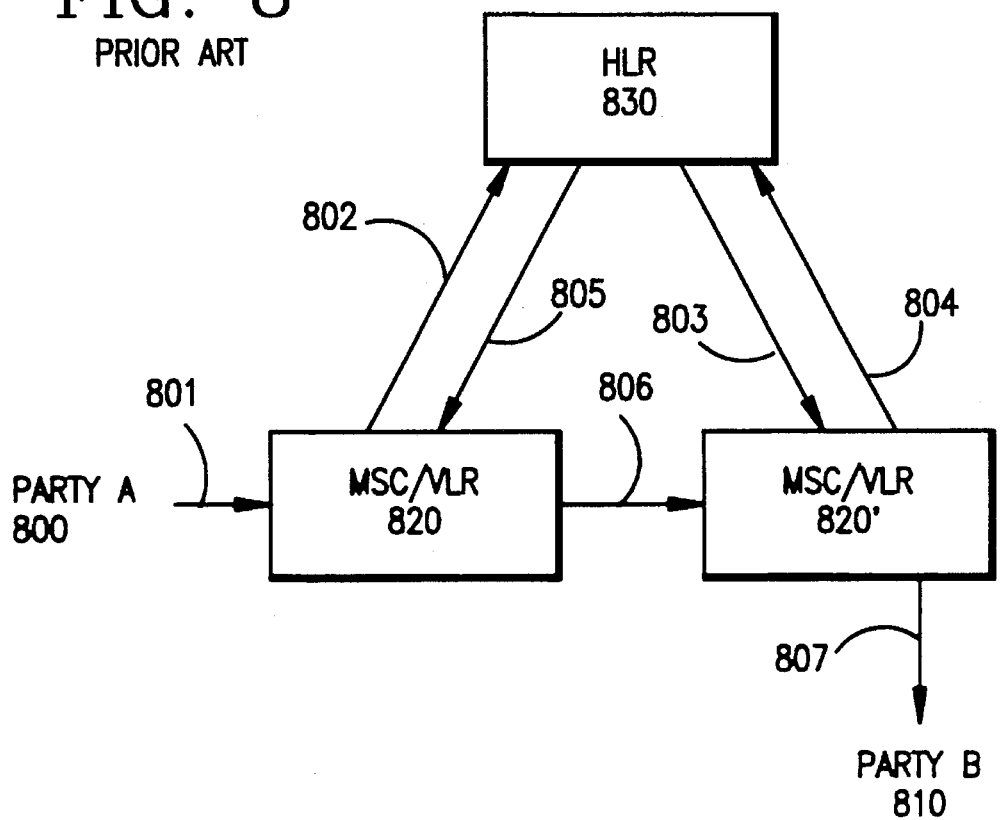
FIG. 8 is a data flow diagram of the GSM network in the prior art.

Turning now to FIG. 8, this process is shown in more detail. Here, the destination mobile station is not within the service area of the MSC receiving the call from the public switch telephone network. In response to an incoming call request 801 from Party A 800, MSC/VLR 820 sends a request 802 for routing information to HLR 830. HLR 830 sends 803 the routing information to the MSC/VLR 820' where the mobile station for Party B 810 is actually located. MSC/VLR 820' send 804 an acknowledgment for the routing information to the HLR 830, which then passes on 805 the acknowledgment to MSC/VLR 820. The acknowledgment 804 and 805 identifies MSC/VLR 820' to MSC/VLR 820. MSC/VLR 820 then routes 806 the call to MSC/VLR 820' which then completes 807 the call to Party B 810.

Figure 9:
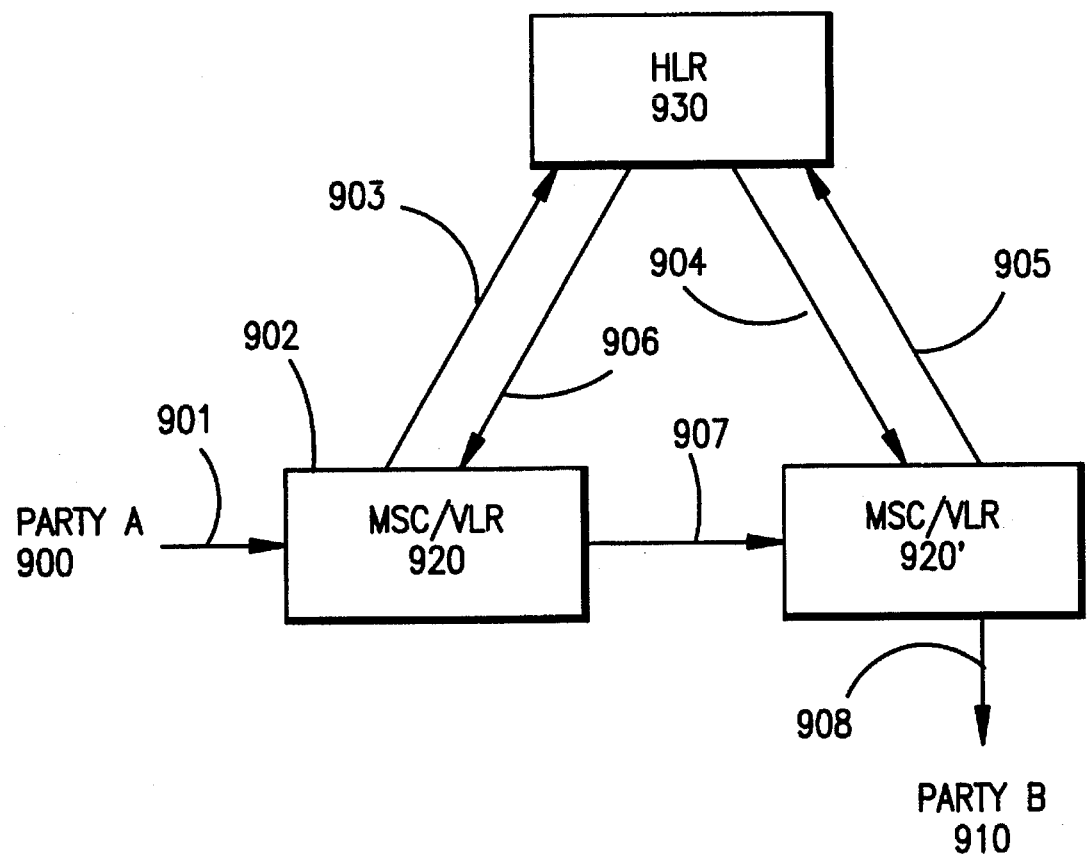
FIG. 9 is a data flow diagram of the GSM network in accordance with the invention.

FIG. 9 illustrates the data flow between the VLR and the HLR for the invention when the mobile station is not within the domain of the MSC handling the call between the public switch telephone network and the mobile station. In response to incoming call request 901 from Party A 900, MSC/VLR 920 looks 902 in VLR for profile information about Party B 910, but does not find it. MSC/VLR 920 then sends a request 903 for routing information to HLR 930. HLR 930 sends 904 the routing information to the MSC/VLR 920' where the mobile station for Party B 910 is actually located. MSC/VLR 920' send 905 an acknowledgment for the routing information to the HLR 930, which then passes on 906 the acknowledgment to MSC/VLR 920. The acknowledgment 905 and 906 identifies MSC/VLR 920' to MSC/VLR 920. MSC/VLR 920 then routes 907 the call to MSC/VLR 920' which then completes 908 the call to Party B 910.

Figure 10:
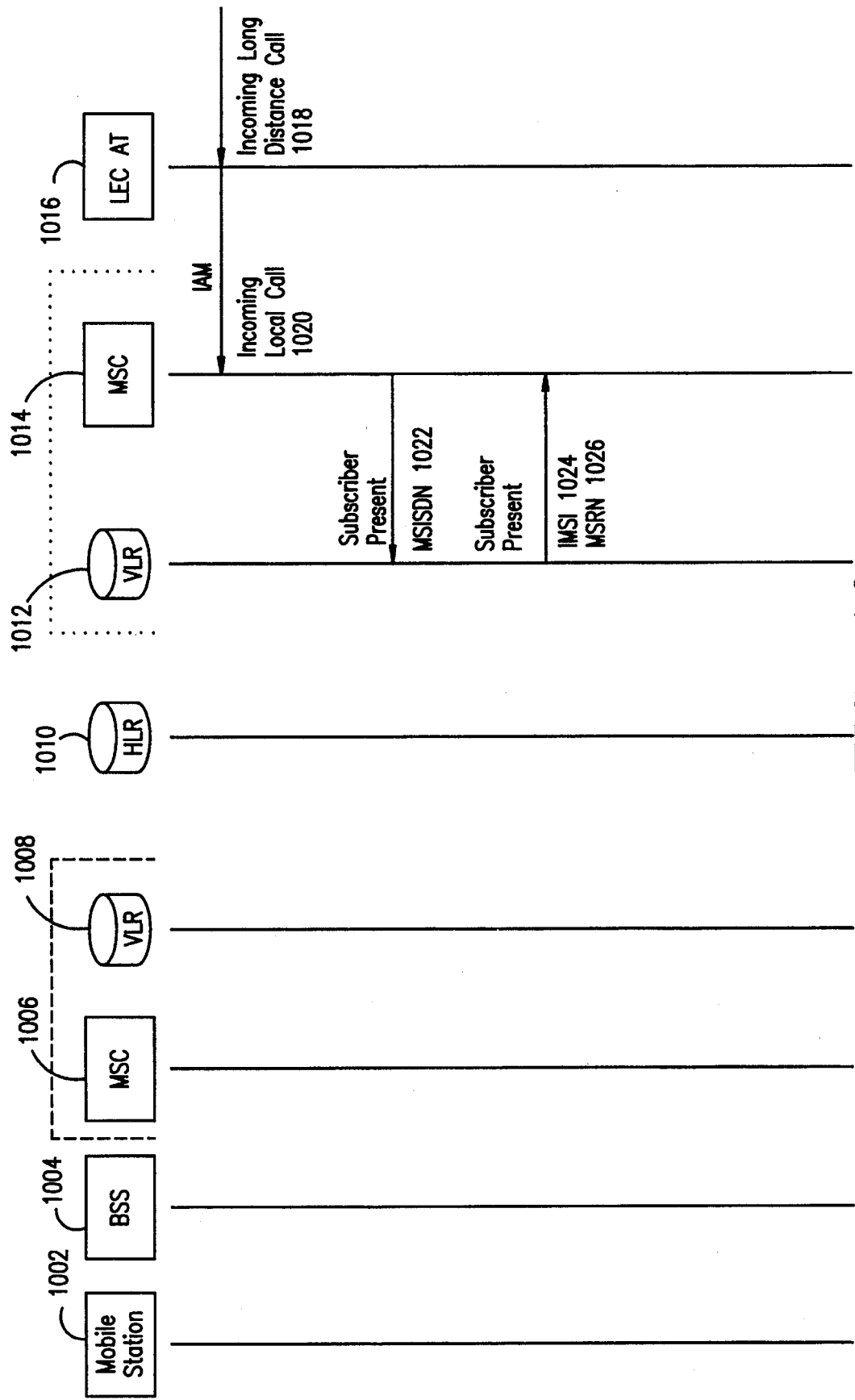
FIG. 10 is a sequencing diagram of a basic call with a subscriber present, in accordance with the invention.

In FIG. 10, an incoming long distance call 1018 to the local exchange carrier 1016 (LEC), or an incoming local call 1020 from LEC 1016 triggers MSC 1014 to request information about the destination mobile station from local VLR 1012. MSC 1014 does this by sending the mobile station international ISDN number 1022 (MSISDN) to the local VLR 1012. The destination mobile station is present within the service area of MSC 1014, so VLR 1012 returns the international mobile station identity 1024 (IMSI)and the mobile station roaming number 1026 (MSRN). With IMSI 1024 and MSRN 1026, MSC 1014 is then able to complete the call.

Figure 11:
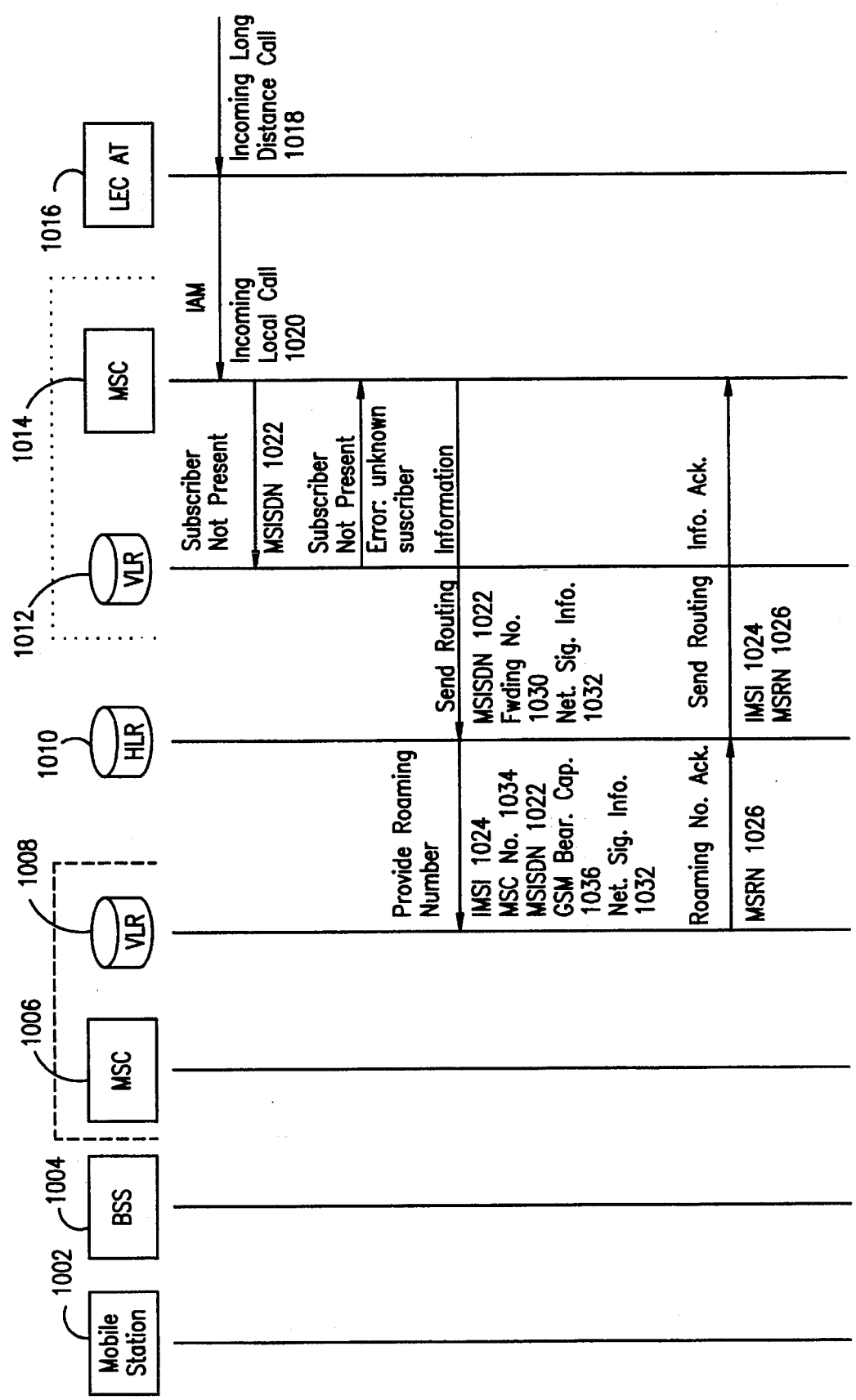
FIG. 11 is a sequencing diagram of a basic call with a subscriber not present, in accordance with the invention.

In FIG. 11, an incoming long distance call 1018 to the local exchange carrier 1016 (LEC), or an incoming local call 1020 from LEC 1016 triggers MSC 1014 to request information about the destination mobile station from local VLR 1012. MSC 1014 does this by sending the mobile station international ISDN number 1022 (MSISDN) to the local VLR 1012. Here, the destination mobile station is not present within the service area of MSC 1014, so VLR 1012 returns unknown subscriber error message 1028. MSC 1014 then accesses HLR 1010 by sending to MSISDN 1022 to HLR 1010. In the same message, MSC 1014 also sends the mobile station forwarding number 1030 and network signaling information 1032 to HLR 1010. HLR 1010 accesses the VLR where the destination mobile station is currently located, here VLR 1008. HLR 1010 sends VLR 1008 the mobile station IMSI 1024 and MSISDN 1022, the number 1034 of the requesting MSC, the GSM bearer capability 1036 and network signaling information 1032. VLR 1008 then returns the destination mobile station roaming number 1026 to HLR 1010. HLR 1010 then sends IMSI 1024 and MSRN 1026 to MSC 1014 which then completes the call.

Figure 12:
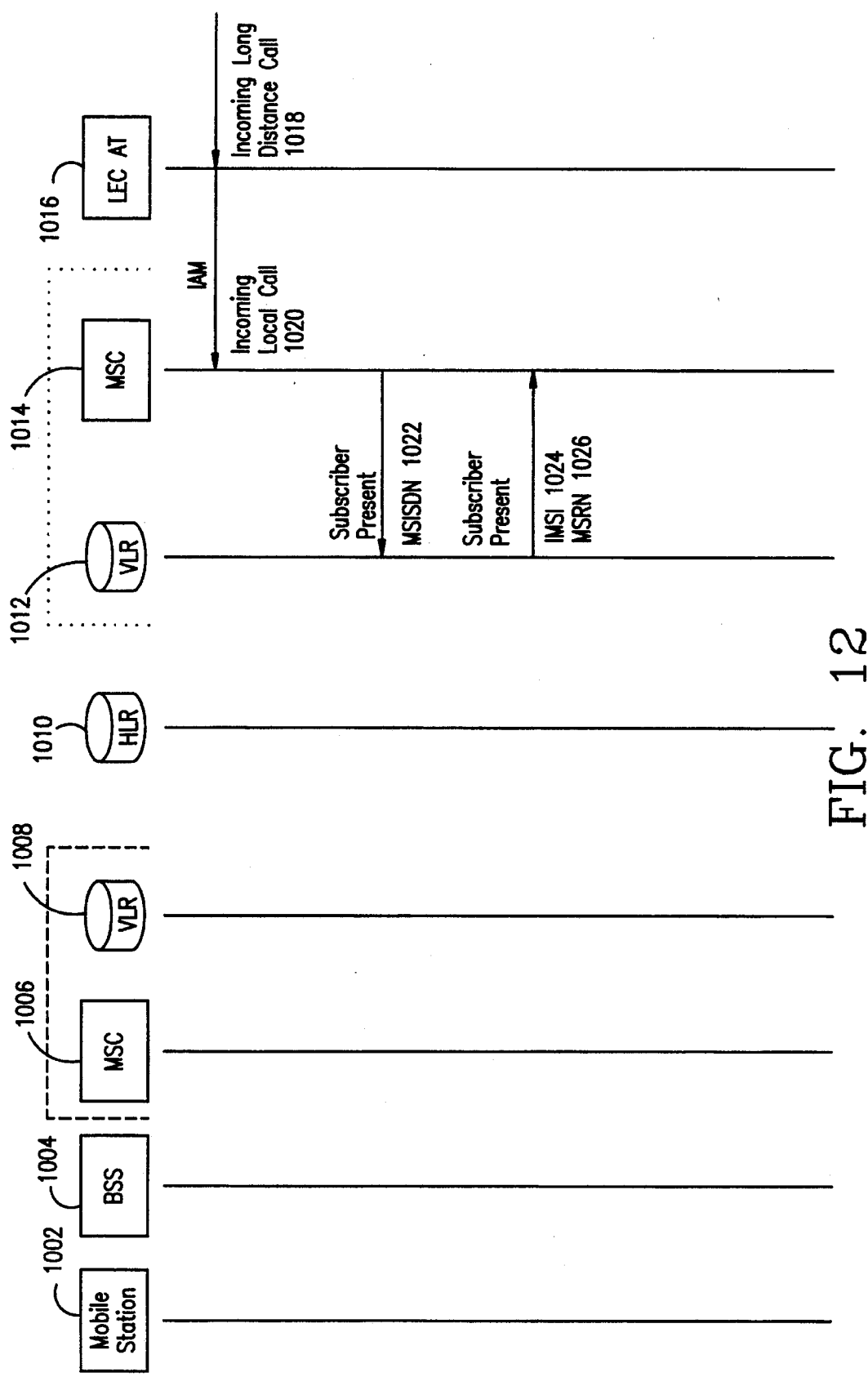
FIG. 12 is a sequencing diagram of the go-HLR parameter in the ISD embodiment for the basic call, subscriber present, in accordance with the invention.

In FIG. 12, the HLR query flag is present in the ISD mobile station profiles. An incoming long distance call 1018 to the local exchange carrier 1016 (LEC), or an incoming local call 1020 from LEC 1016 triggers MSC 1014 to request information about the destination mobile station from local VLR 1012. MSC 1014 does this by sending the mobile station international ISDN number 1022 (MSISDN) to the local VLR 1012. The destination mobile station is present within the service area of MSC 1014, so VLR 1012 returns the international mobile station identity 1024 (IMSI)and the mobile station roaming number 1026 (MSRN). With IMSI 1024 and MSRN 1026, MSC 1014 is then able to complete the call.

Figure 13:
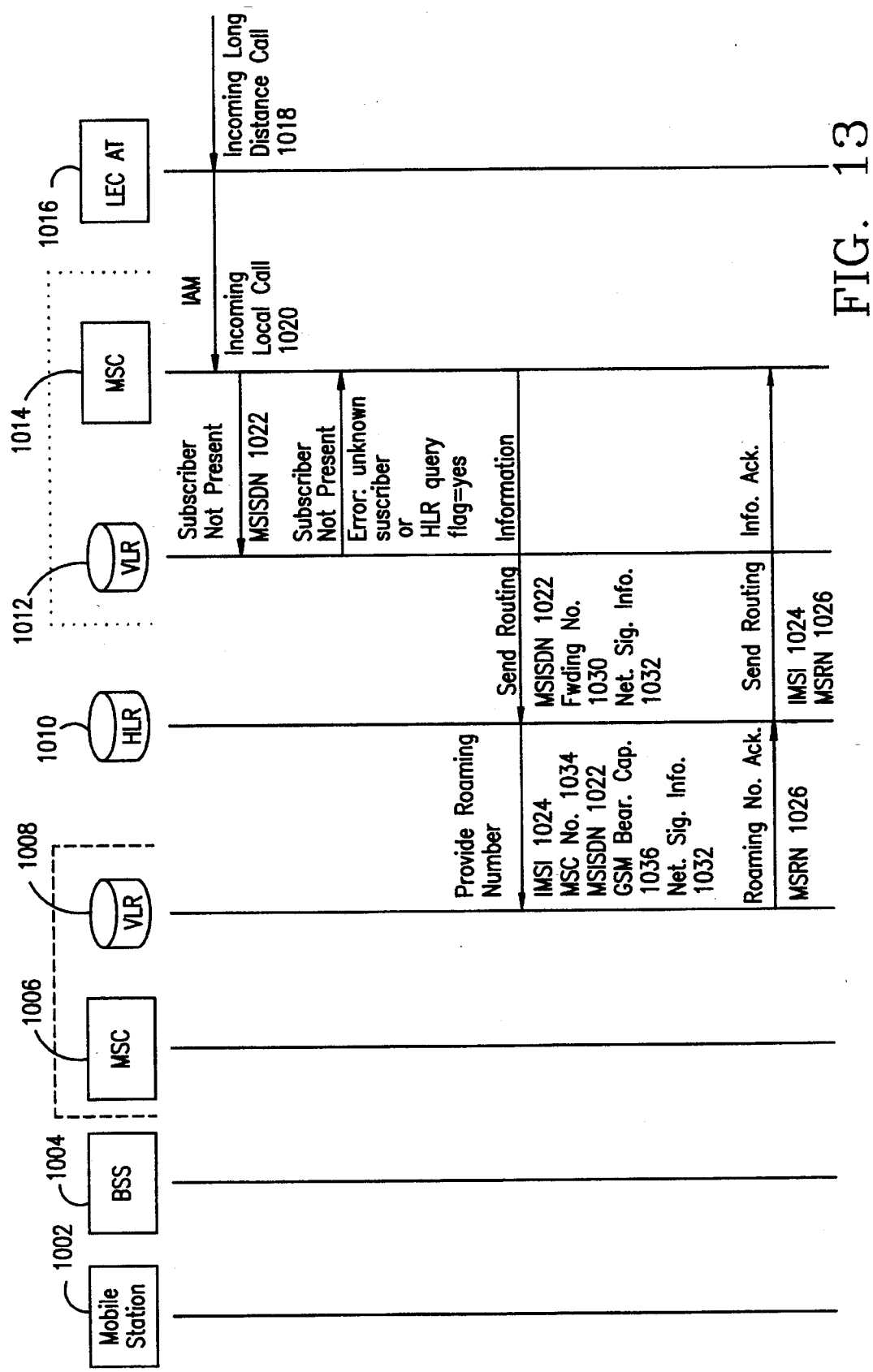
FIG. 13 is a sequencing diagram of basic call, subscriber not present, for the alternate embodiment of the invention referred to in FIG. 12.

In FIG. 13, the HLR query flag is present in the ISD mobile station profiles. An incoming long distance call 1018 to the local exchange carrier 1016 (LEC), or an incoming local call 1020 from LEC 1016 triggers MSC 1014 to request information about the destination mobile station from local VLR 1012. MSC 1014 does this by sending the mobile station international ISDN number 1022 (MSISDN) to the local VLR 1012. Here, either the destination mobile station is not present within the service area of MSC 1014 or the HLR query flag is set to yes. If the destination mobile station is not present within the service area of MSC 1014, VLR 1012 returns unknown subscriber error message 1028. If the HLR query flag is set to yes, VLR 1012 returns a GO-HLR message 1038. In either case, MSC 1014 then accesses HLR 1010 by sending to MSISDN 1022 to HLR1010. In the same message, MSC 1014 also sends the mobile station forwarding number 1030 and network signaling information 1032 to HLR 1010. HLR 1010 accesses the VLR where the destination mobile station is currently located, here VLR 1008. HLR 1010 sends VLR 1008 the mobile station IMSI 1024 and MSISDN 1022, the number 1034 of the requesting MSC, the GSM bearer capability 1036 and network signaling information 1032. VLR 1008 then returns the destination mobile station roaming number 1026 to HLR 1010. HLR 1010 then sends IMSI 1024 and MSRN 1026 to MSC 1014 which then completes the call.

Although the present invention is illustrated by means of the GSM protocol, it will be seen by those of skill in the art that GSM is just one of several protocols for mobility. The invention is applicable to any network in which HLRs and VLRs, or similar network elements, are used for tracking mobility.

What is claimed is:

1. A method of directing calls from a public switch telephone network to a mobile station within a mobile telephone network, the mobile telephone network including a plurality of mobile telephone stations, a plurality of base stations for communicating with the mobile telephone stations, a plurality of mobile services switching centers for routing calls between base stations and between base stations and the public switch telephone network, a plurality of visitor location registers for storing data relating to visiting mobile telephone stations, and at least one home location register for storing all management data relating to all mobile telephone stations in the mobile telephone network, the method comprising the steps of:

- receiving a call directed to a mobile telephone station from a public switch telephone network in a mobile services switching center;
- attempting to locate a profile of the mobile telephone station in a visitor location register, the profile having an HLR query flag for indicating whether the home location register should be queried;
- checking a status of the HLR query flag, if the profile of the mobile telephone station is located in the visitor location register;
- sending a query message to a home location register requesting routing information for the call, if the HLR query flag is set to yes;
- completing the call to the mobile telephone station using the profile in the visitor location register, if the HLR query flag is set to no;
- sending a query message to the home location register requesting routing information for the call, if the mobile telephone profile is not found in the visitor location register; and
- completing the call to the mobile telephone station using the routing information received from the home location register, if a query message requesting routing information has been sent to the home location register.

2. The method of claim 1, further comprising the step of:
- receiving routing information from the home location register.

3. A system for directing calls from a public switch telephone network to a mobile station within a mobile telephone network, the mobile telephone network including a plurality of mobile telephone stations, a plurality of base stations for communicating with the mobile telephone stations, a plurality of mobile services switching centers for routing calls between base stations and between base stations and a public switch telephone network, a plurality of visitor location registers for storing data relating to visiting mobile telephone stations, and at least one home location register for storing all management data relating to all mobile telephone stations in the mobile telephone network, the apparatus comprising:

- means, coupled to a public switch telephone network, for receiving a call directed to a mobile telephone station from the public switch telephone network;
- means, coupled to the call receiving means and to a visitor location register, for attempting to locate a profile of the mobile telephone station in the visitor location register, the profile having an HLR query flag for indicating whether the home location register should be queried;
- means, coupled to the profile locating means, for checking a status of the HLR query flag, if the profile of the mobile telephone station is located in the visitor location register;
- means, coupled to the status checking means and to a home location register, for sending a first query message to a home location register requesting routing information for the call, if the HLR query flag is set to yes;
- means, coupled to the status checking means, for completing the call to the mobile telephone station using the profile in the visitor location register, if the HLR query flag is set to no;
- means, coupled to the profile locating means and to the home location register, for sending a second query message to the home location register requesting routing information for the call, if the mobile telephone profile is not found in the visitor location register; and
- means, coupled to the profile locating means, the status checking means and the home location register, for completing the call to the mobile telephone station using the routing information received from the home location register, if a first or second query message requesting routing information has been sent to the home location register.

4. The system of claim 3 further comprising:
- means, coupled to the home location register and to the call completing means, for receiving routing information from the home location register.

* * * * *